United States Patent
Lu

(10) Patent No.: US 8,807,497 B2
(45) Date of Patent: Aug. 19, 2014

(54) FOOTSTAND MECHANISM FOR ADJUSTING A TILT ANGLE OF AN ELECTRONIC DEVICE AND ELECTRONIC DEVICE THEREWITH

(75) Inventor: Hsiang-Ming Lu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 327 days.

(21) Appl. No.: 13/402,852

(22) Filed: Feb. 22, 2012

(65) Prior Publication Data
US 2013/0009526 A1    Jan. 10, 2013

(30) Foreign Application Priority Data
Jul. 7, 2011 (TW) ............................ 100124023 A

(51) Int. Cl.
*F16M 11/24* (2006.01)
*G06F 1/16* (2006.01)

(52) U.S. Cl.
CPC ...................................... *G06F 1/166* (2013.01)
USPC ................ 248/188.2; 248/188.1; 361/679.26; 361/679.27

(58) Field of Classification Search
USPC .......... 248/188.1, 188.2, 188.3, 188.8, 188.9, 248/188.91, 351, 677, 688, 923, 917–919; 361/679.26, 679.27
See application file for complete search history.

(56) References Cited

U.S. PATENT DOCUMENTS

| | | | |
|---|---|---|---|
| 3,040,391 A * | 6/1962 | Saunders | 49/425 |
| 3,968,949 A * | 7/1976 | Romano, Jr. | 248/650 |
| 4,516,508 A * | 5/1985 | Kako et al. | 108/7 |
| 4,783,879 A * | 11/1988 | Weaver | 16/34 |
| 4,856,748 A * | 8/1989 | Obermeyer | 248/688 |
| 5,351,922 A * | 10/1994 | Lindsay | 248/188.5 |
| 5,687,940 A * | 11/1997 | England | 248/188.2 |
| 5,878,983 A * | 3/1999 | Olson et al. | 248/188.4 |
| 5,971,408 A * | 10/1999 | Mandel et al. | 280/43.2 |
| 6,189,846 B1 * | 2/2001 | Wang | 248/188.1 |
| 6,311,941 B1 * | 11/2001 | Feldmeyer | 248/188.8 |
| 6,601,806 B2 * | 8/2003 | Wing et al. | 248/188.2 |
| 6,644,628 B1 * | 11/2003 | Triche | 254/88 |
| 6,682,240 B1 * | 1/2004 | Chou | 400/691 |
| 6,837,339 B2 * | 1/2005 | Lees | 182/200 |
| 7,270,306 B2 * | 9/2007 | Chen | 248/188.2 |

(Continued)

OTHER PUBLICATIONS

Office action mailed on Mar. 27, 2014 for the Taiwan applicatioin No. 100124023, filing date: Jul. 7, 2011, p. 1 line 9~13.

(Continued)

*Primary Examiner* — Nkeisha Smith
(74) *Attorney, Agent, or Firm* — Winston Hsu; Scott Margo

(57) ABSTRACT

A footstand mechanism for adjusting a tilt angle of an electronic device includes a shaft, a first engaging member, a polygonal block and a second engaging member. The shaft is rotatably disposed on a base of the electronic device, and the first engaging member is disposed on the base and located in a position corresponding to an end of the shaft. The polygonal block is installed on the shaft and rotates with the shaft. The polygonal block includes a plurality of supporting surfaces, and the plurality of supporting surfaces is respectively away from the shaft by different distances. The second engaging member is disposed at the end of the shaft and includes a plurality of engaging portions. The plurality of engaging portions is corresponding to the plurality of supporting surfaces for respectively engaging with the first engaging member.

14 Claims, 10 Drawing Sheets

(56) References Cited

U.S. PATENT DOCUMENTS

| | | | |
|---|---|---|---|
| 7,566,043 B2 * | 7/2009 | Chen | 248/616 |
| 7,845,603 B2 * | 12/2010 | Courtney | 248/188.2 |
| 7,901,091 B2 * | 3/2011 | Chen et al. | 353/119 |
| 2006/0169854 A1 * | 8/2006 | Chen | 248/188.2 |
| 2011/0133043 A1 * | 6/2011 | Chang | 248/188.9 |

OTHER PUBLICATIONS

Office action mailed on May 13, 2014 for the China application No. 201110201387.3, p. 3 line 5~31 and p. 4 line 1~27.

* cited by examiner

FOOTSTAND MECHANISM FOR ADJUSTING A TILT ANGLE OF AN ELECTRONIC DEVICE AND ELECTRONIC DEVICE THEREWITH

BACKGROUND OF THE INVENTION

1. Field of the Invention

The present invention relates to a footstand mechanism and a related electronic device, and more particularly, to a footstand mechanism for adjusting a tilt angle of an electronic device and a related electronic device.

2. Description of the Prior Art

Recently, a notebook computer is becoming one of the most popular electronic devices in human's daily life due to its portability. On the other hand, small size of the notebook computer results in disadvantages of the notebook computer to connect to other peripherals. Thus, a docking station has been one of the main peripherals for the notebook computer to assist the notebook computer to connect to other peripherals, such as an optical disk drive, an auxiliary battery and so on. However, a rubber cushion is used to support the docking station on a holding surface, such as a desk, as a footstand. Since the rubber cushion is fixed on a bottom of the docking station, an angle included between the docking station and the holding surface in use is fixed. When the conventional docking station with the rubber cushion is combined with the notebook computer, the docking station can not adjust a tilt angle of the notebook computer corresponding to different environments, so as to greatly reduce flexibility of the docking station in use as well as fail to satisfy demands for ergonomics. As a result, it greatly reduces convenience and comfort of the docking station in use.

SUMMARY OF THE INVENTION

The present invention provides a footstand mechanism for adjusting a tilt angle of an electronic device and a related electronic device.

According to the claimed invention, a footstand mechanism for adjusting a tilt angle of an electronic device includes a shaft, a first engaging member, a polygonal block and a second engaging member.

The shaft is rotatably disposed on a base of the electronic device, and the first engaging member is disposed on the base and located in a position corresponding to an end of the shaft. The polygonal block is installed on the shaft and rotates with the shaft. The polygonal block includes a plurality of supporting surfaces, and the plurality of supporting surfaces is respectively away from the shaft by different distances. The second engaging member is disposed at the end of the shaft and includes a plurality of engaging portions.

The plurality of engaging portions is corresponding to the plurality of supporting surfaces for respectively engaging with the first engaging member.

According to the claimed invention, the footstand mechanism further includes a fixing member and a sliding block. The fixing member is disposed at another end of the shaft and includes a plurality of fixing portions respectively corresponding to the plurality of the engaging portions of the second engaging member. The sliding block is disposed on the base and located nearby the fixing member. The sliding block includes a constraining portion for engaging with the corresponding fixing portion when the sliding block slides to a first position and when any one of the plurality of engaging portions engages with the first engaging member, so as to fix the shaft. The constraining portion separates from the fixing member when the sliding block slides to a second position, so as to release the shaft.

According to the claimed invention, the constraining portion is a recess structure.

According to the claimed invention, the footstand mechanism further includes a fixing lug and a latching member. The fixing lug is disposed on a side of the sliding block and has a first constraining slot and a second constraining slot. The latching member is used for selectively latching the first constraining slot or the second constraining slot, so as to fix the sliding block at the first position or at the second position, correspondingly.

According to the claimed invention, the footstand mechanism further includes a push button and the push button includes a main body and at least one hook. The main body is slidably disposed on the base of the electronic device. The at least one hook is connected to the main body and engages with the sliding block for driving the sliding block when the main body slides.

According to the claimed invention, the footstand mechanism further includes an angle constraining structure for constraining a rotating stroke of the shaft, so as to constrain a rotating angle of the polygonal block.

According to the claimed invention, the plurality of supporting surfaces includes three supporting surfaces.

According to the claimed invention, an electronic device includes a base and a footstand mechanism disposed on the base. The foot mechanism includes a shaft, a first engaging member, a polygonal block and a second engaging member. The shaft is rotatably disposed on a base of the electronic device, and the first engaging member is disposed on the base and located in a position corresponding to an end of the shaft. The polygonal block is installed on the shaft and rotates with the shaft. The polygonal block includes a plurality of supporting surfaces, and the plurality of supporting surfaces is respectively away from the shaft by different distances. The second engaging member is disposed at the end of the shaft and includes a plurality of engaging portions. The plurality of engaging portions is corresponding to the plurality of supporting surfaces for respectively engaging with the first engaging member.

According to the claimed invention, the electronic device is a notebook computer or a docking station.

In summary, the footstand mechanism of the present invention utilizes the plurality of supporting surfaces of the polygonal block to abut against a holding surface, e.g. a desk, when the polygonal block rotates with the shaft. In addition, since the supporting surfaces are respectively away from the shaft by different distances, the footstand mechanism of the present invention is capable of lifting the shaft above the holding surface with different distances by utilizing the polygonal block. For example, when a first supporting surface of the polygonal block abuts against the holding surface, the shaft can be lifted above the holding surface by a first distance.

When the polygonal block is rotated with the shaft to a position that a second supporting surface abuts against the holding surface, the shaft can be lifted above the holding surface by a second distance.

Accordingly, the polygonal block of the footstand mechanism lifts a bottom of the related electronic device with different distances.

In such a manner, the footstand mechanism of the present invention is capable of adjusting the tilt angle of the related electronic device corresponding to different environments, so as to greatly enhance convenience and comfort of the electronic device in use as well as to satisfy demands for ergonomics.

These and other objectives of the present invention will no doubt become obvious to those of ordinary skill in the art after reading the following detailed description of the embodiment that is illustrated in the various figures and drawings.

DETAILED DESCRIPTION

Figure 1:
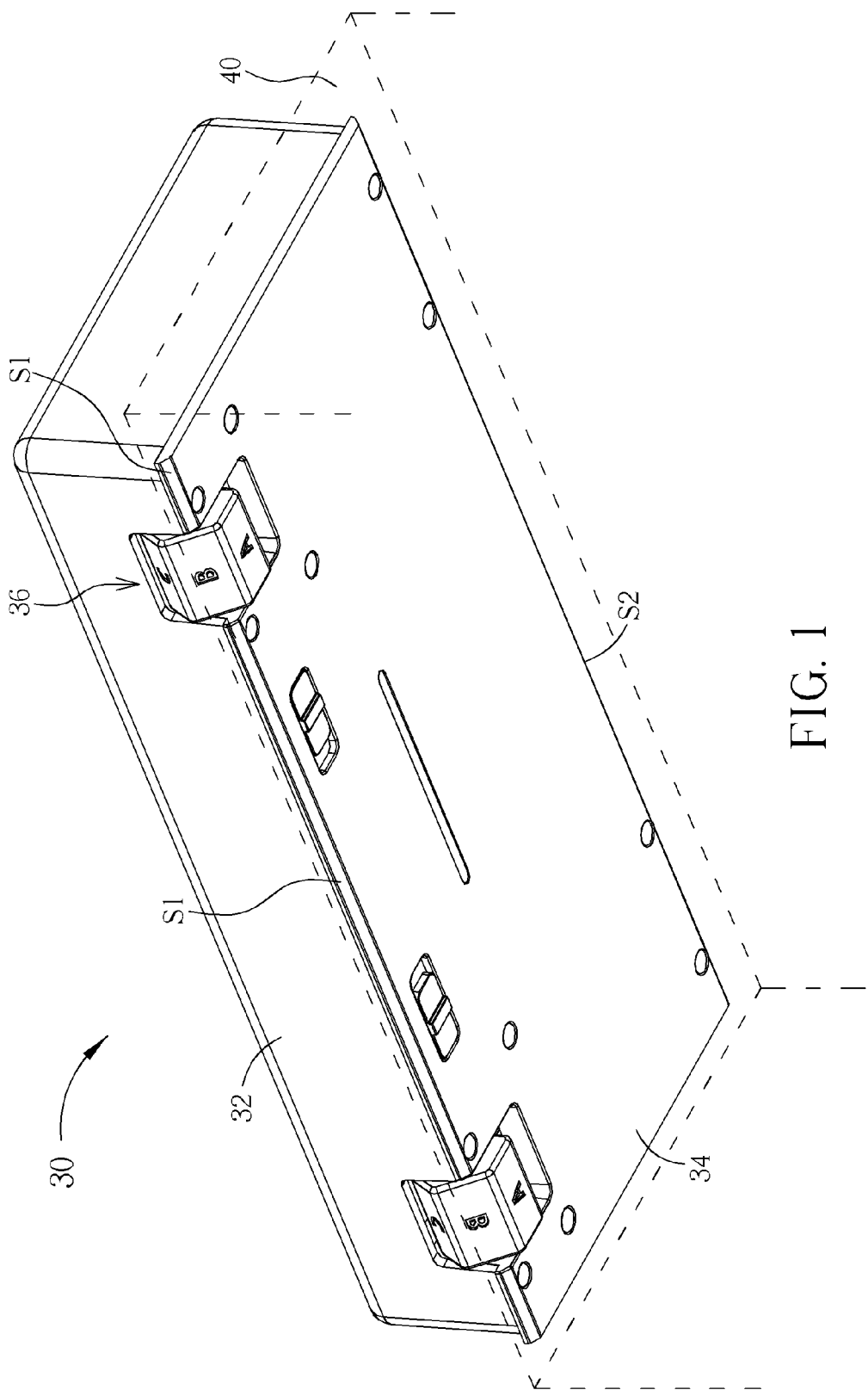
FIG. 1 is a diagram of an electronic device according to an embodiment of the present invention.
Figure 2:
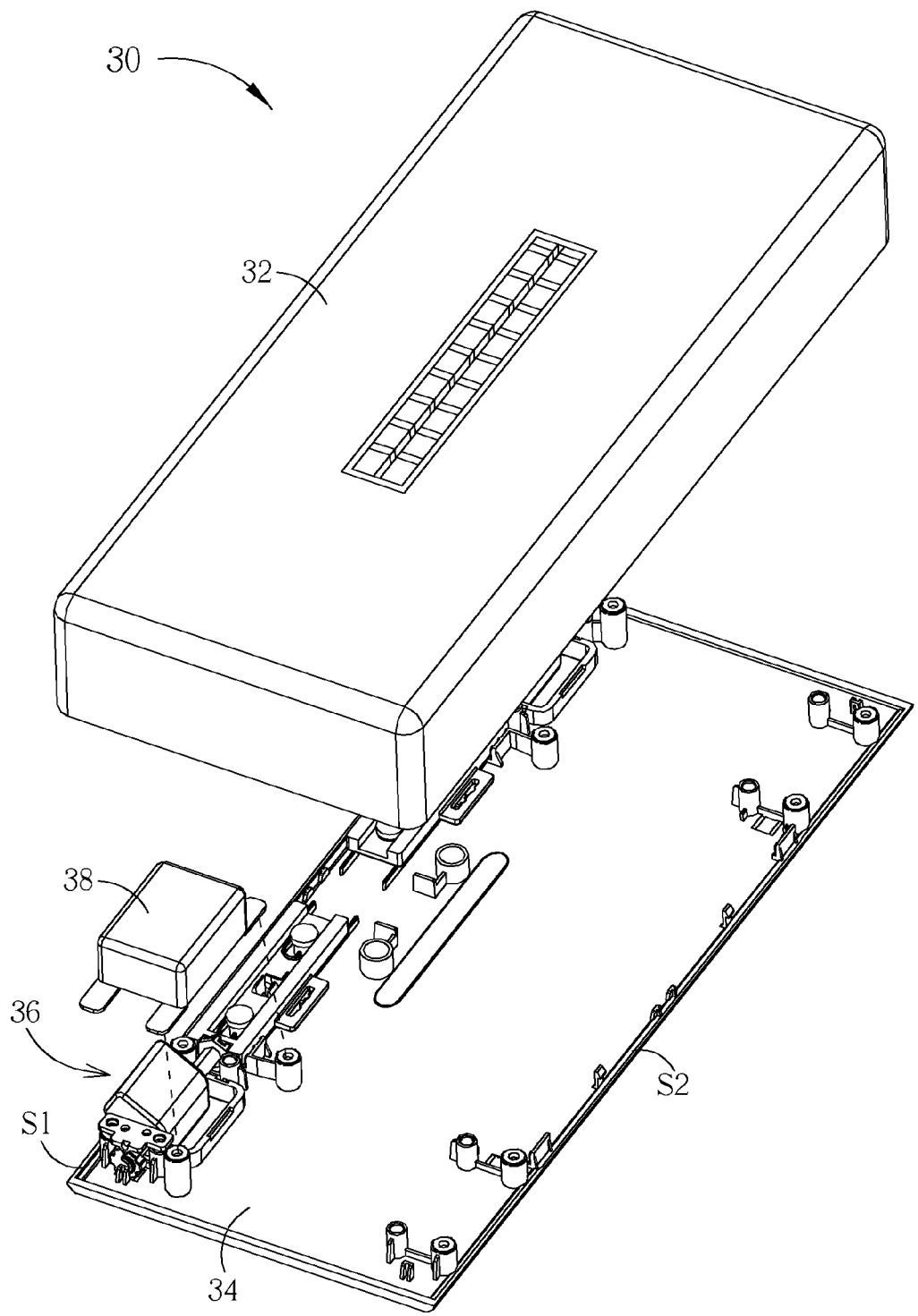
FIG. 2 is a partially exploded diagram of the electronic device according to the embodiment of the present invention.

Please refer to FIG. 1 and FIG. 2. FIG. 1 is a diagram of an electronic device 30 according to an embodiment of the present invention. FIG. 2 is a partially exploded diagram of the electronic device 30 according to the embodiment of the present invention. As shown in FIG. 1 and FIG. 2, the electronic device 30 includes a device body 32, a base 34, a footstand mechanism 36 and a protective cover 38. The base 34 is disposed on a bottom of the device body 32, and the footstand mechanism 36 is disposed on a first side S1 of the base 34. The protective cover 38 is disposed on the base 34 for preventing objects, such as other internal components of the electronic device 30, dusts and so on, from entrance, so as to ensure motions of the footstand mechanism 36. Accordingly, when the electronic device 30 is disposed on a holding surface 40 such as a desk, the footstand mechanism 36 can lift the first side S1 of the base 34, such that a second side S2 opposite to the first side S1 of the base 34 abuts against the holding surface 40. In such a manner, there is a tilt angle formed between the electronic device 30 and the holding surface 40, so as to facilitate a user to operate the electronic device 30.

In this embodiment, the electronic device 30 can be a docking station of a notebook computer, the base 34 is a bottom cover of the docking station, and the footstand mechanism 36 is a footstand mechanism adapted to the docking station. It should be noticed that application of the footstand mechanism 36 is not limited to those mentioned in this embodiment. For example, the electronic device 30 can also be a notebook computer, a Personal Digital Assistant (PDA), a tablet computer and so on. The base 34 is a bottom cover corresponding to the electronic device 30, and the footstand mechanism 36 is a footstand mechanism adapted to the corresponding electronic device 30.

Figure 3:
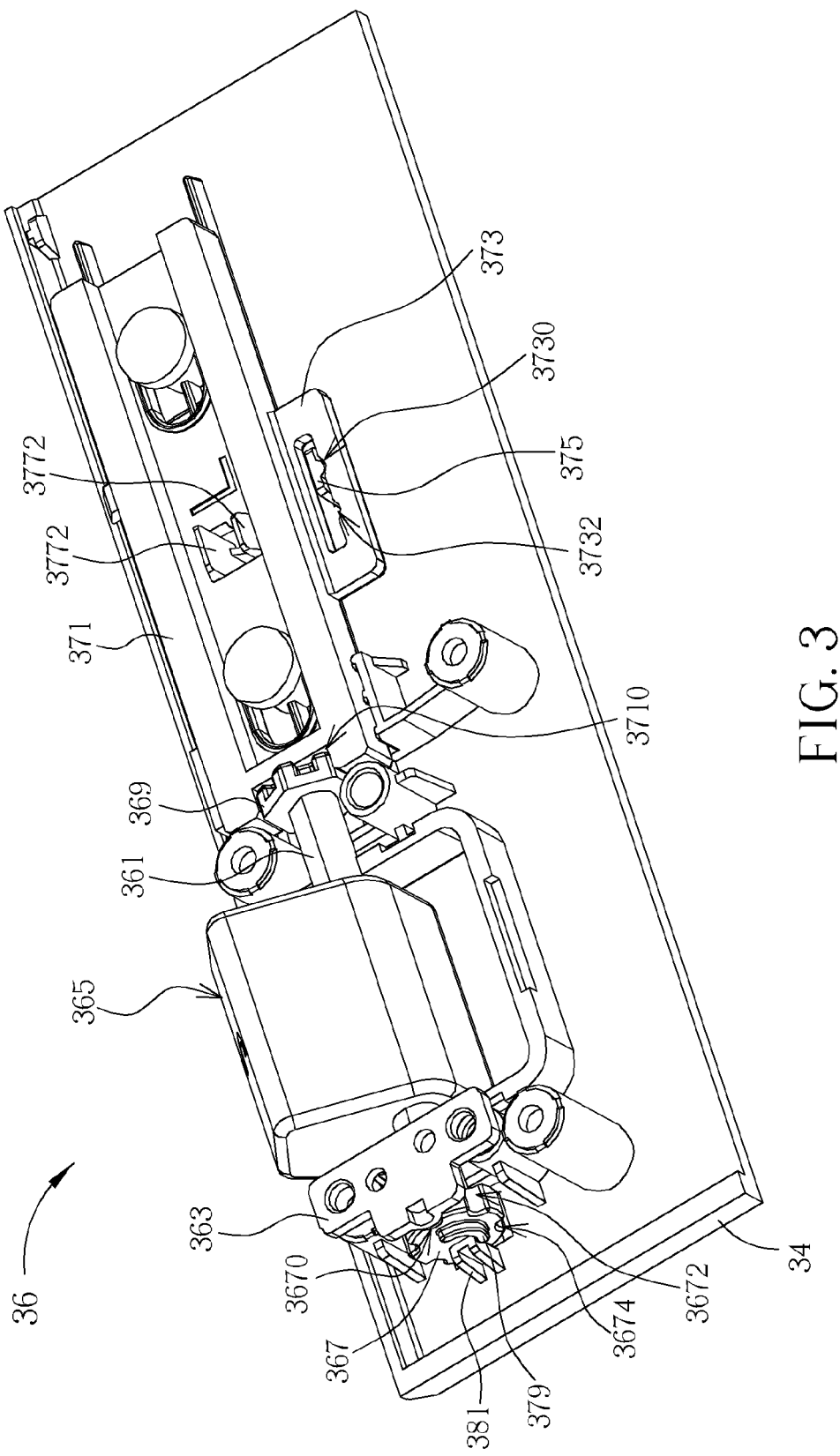
FIG. 3 is a diagram illustrating that a base and a footstand mechanism are fixed in a first position according to the embodiment of the present invention.
Figure 4:
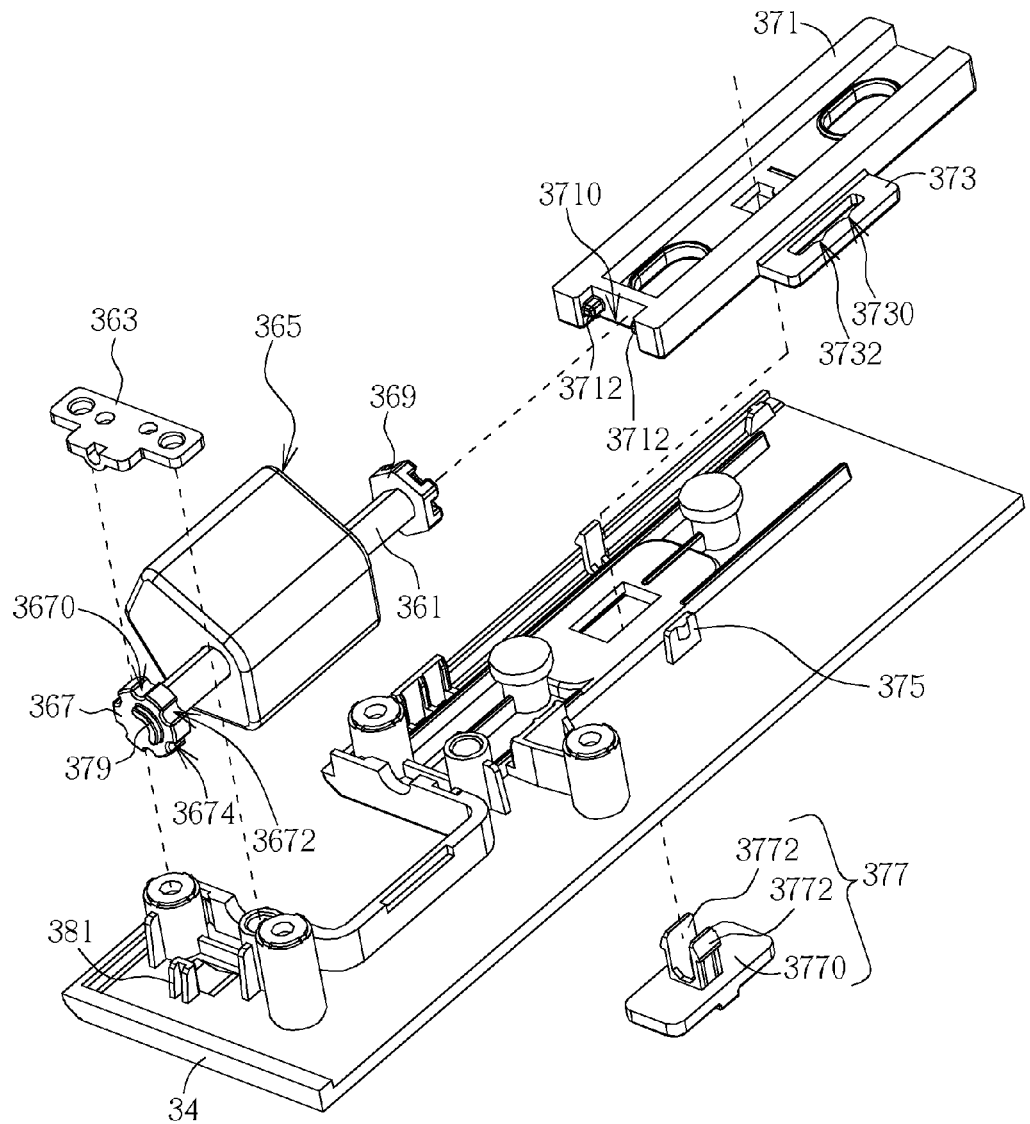
FIG. 4 is an exploded diagram of the base and the footstand mechanism according to the embodiment of the present invention.
Figure 5:
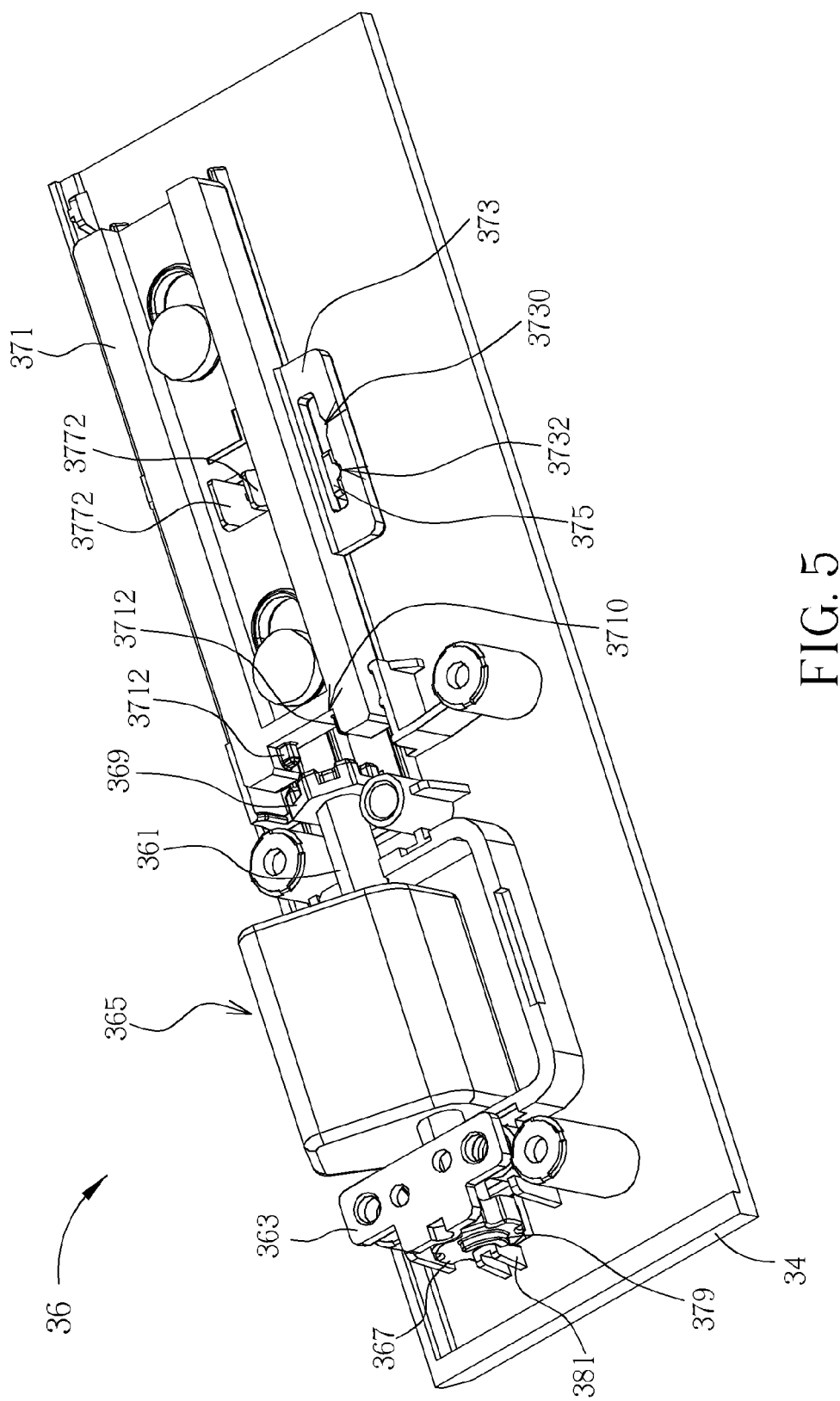
FIG. 5 is a diagram illustrating that the base and the footstand mechanism are fixed in a second position according to the embodiment of the present invention.
Figure 6:
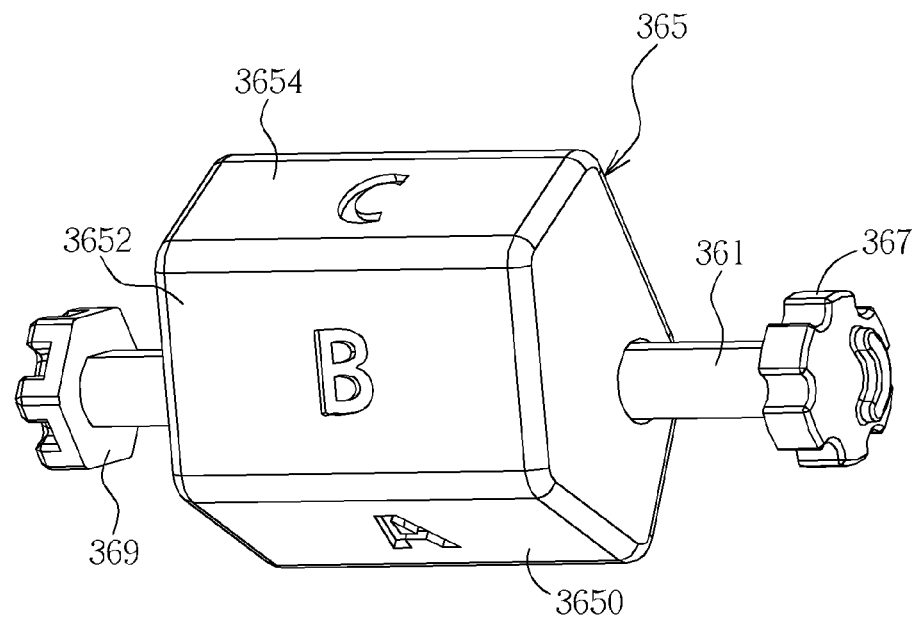
FIG. 6 is a diagram of a shaft, a polygonal block, a second engaging member and a fixing member in another view according to the embodiment of the present invention.
Figures 7, 8:
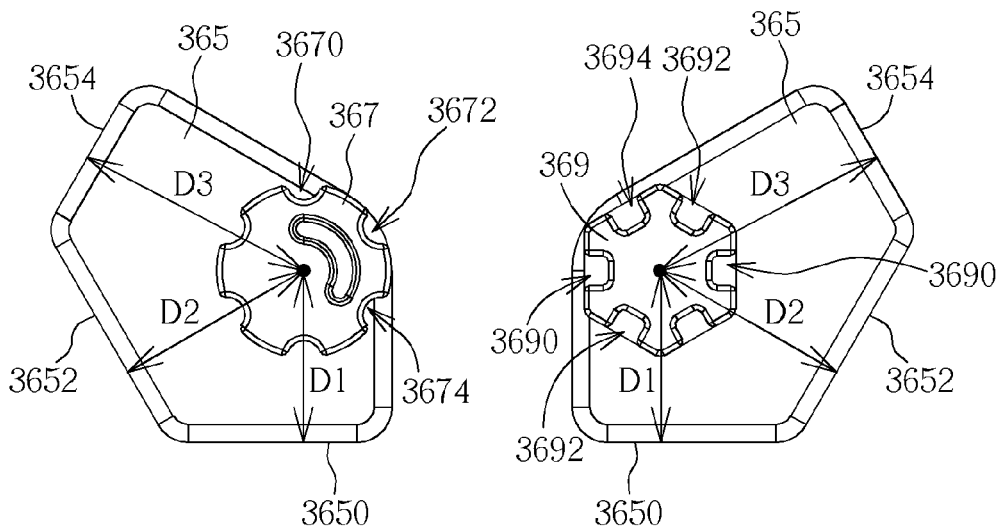
FIG. 7 is a right view of the shaft, the polygonal block, the second engaging member and the fixing member as shown in FIG. 6.
FIG. 8 is a left view of the shaft, the polygonal block, the second engaging member and the fixing member as shown in FIG. 6.

Please refer to FIG. 3 to FIG. 5. FIG. 3 is a diagram illustrating that the base 34 and the footstand mechanism 36 are fixed in a first position according to the embodiment of the present invention. FIG. 4 is an exploded diagram of the base 34 and the footstand mechanism 36 according to the embodiment of the present invention. FIG. 5 is a diagram illustrating that the base 34 and the footstand mechanism 36 are fixed in a second position according to the embodiment of the present invention. As shown in FIG. 3 to FIG. 5, the footstand mechanism 36 includes a shaft 361, a first engaging member 363, a polygonal block 365, a second engaging member 367, a fixing member 369, a sliding block 371, a fixing lug 373, a latching member 375 and a push button 377. The shaft 361 is rotatably disposed on the base 34 of the electronic device 30, and the polygonal block 365 is installed on the shaft 361 and capable of rotating with the shaft 361. The second engaging member 367 is disposed at an end of the shaft 361, and the first engaging member 363 is disposed on the base 34 and located in a position corresponding to the end of the shaft 361. In addition, please refer to FIG. 6 to FIG. 8. FIG. 6 is a diagram of the shaft 361, the polygonal block 365, the second engaging member 367 and the fixing member 369 in another view according to the embodiment of the present invention. FIG. 7 is a right view of the shaft 361, the polygonal block 365, the second engaging member 367 and the fixing member 369 as shown in FIG. 6. FIG. 8 is a left view of the shaft 361, the polygonal block 365, the second engaging member 367 and the fixing member 369 as shown in FIG. 6. As shown in FIG. 6 to FIG. 8, the polygonal block 365 includes three supporting surfaces 3650, 3652, 3654 which are respectively away from an axis of the shaft 361 by a first distance D1, a second distance D2 and a third distance D3. In this embodiment, the first distance D1, the second distance D2 and the third distance D3 can be different from one another. It should be noticed that amount of the supporting surfaces of the polygonal block 365 is not limited to that mentioned in this embodiment. For example, there can be two or four supporting surfaces of the polygonal block 365, and distances between each of the supporting surfaces and the axis of the shaft 361 can be different from each other. In other words, the polygonal block 365 can include a plurality of supporting surfaces away form the shaft 361 by different distances. As for which one is adopted, it depends on practical demands.

In this embodiment, the second engaging member 367 includes three engaging portions 3670, 3672, 3674 for respectively engaging with the first engaging member 363. In this embodiment, the engaging portions 3670, 3672, 3674 can be a recess structure, respectively. Furthermore, the first engaging member 363 includes a protruding structure for engaging with the recess structure. In addition, the three engaging portions 3670, 3672, 3674 are respectively corresponding to the three supporting surfaces 3650, 3652, 3654. For example, referring to FIG. 3 and FIG. 7, when the shaft 361 is rotated to a position where the supporting surface 3650 is oriented downwards, the engaging portion 3670 can engage with the first engaging member 363, so as to fix the shaft 361. Accordingly, the supporting surface 3650 can be stably oriented downwards. Since relationships of the supporting surface 3652 versus the engaging portion 3672 and the supporting surface 3654 versus the engaging portion 3674 are similar to the relationship of the supporting surface 3650 versus the engaging portion 3670, it is omitted herein for simplicity. It is noticed that amount of the engaging portions is not limited to that mentioned in this embodiment. For example, the amount of the engaging portions of the second engaging member 367 can be identical to the amount of the supporting surfaces. In other words, the second engaging member 367 of the present invention can include a plurality of supporting surfaces for respectively engaging with the first engaging member 363, so as to fix the corresponding supporting surface. Accordingly, the corresponding supporting surface can be oriented downwards and abutted against the holding surface 40. As for which one is adopted, it depends on practical demands.

Furthermore, the fixing member 369 is disposed at another end of the shaft 361, and the sliding block 371 is disposed on the base 34 and located nearby the fixing member 369. In addition, the sliding block 371 includes a constraining portion 3710, and the constraining portion 3710 can be a recess structure. In this embodiment, the fixing member 369 includes three sets of fixing portions 3690, 3692, 3694, and the fixing portions 3690, 3692, 3694 are respectively a recess structure. The fixing portions 3690, 3692, 3694 of the fixing member 369 can be corresponding to the three engaging portions 3670, 3672, 3674 of the second engaging member 367, respectively. For example, referring to FIG. 3 and FIG. 8, when the shaft 361 is rotated to the position where the supporting surface 3650 is oriented downwards, the engaging portion 3670 of the second engaging member 367 can engage with the first engaging member 363, such that the supporting surface 3650 is stably oriented downwards. In the meanwhile, the sliding block 371 can slides to a first position as shown in FIG. 3, such that the fixing portion 3690 of the fixing member 369 engages with the constraining portion 3710 of the sliding block 371. In such a manner, the constraining portion 3710 of the sliding block 371 can fix the shaft 361 cooperatively with the engaging portion 3670 of the second engaging member 367, such that the supporting surface 3650 is stably oriented downwards. Since relationships of the fixing portion 3692 versus the engaging portion 3672 and the fixing portion 3694 versus the engaging portion 3674 are similar to the relationship of the fixing portion 3690 versus the engaging portion 3670, it is omitted herein for simplicity. It should be noticed amount of the fixing portions of the fixing member 369 is not limited to that mentioned in this embodiment. For example, the amount of the fixing portions of the second engaging member 367 can be identical to the amount of the engaging portions of the second engaging member 367 as well as the amount of the supporting surfaces. In other words, the fixing member 369 of the present invention can include a plurality of fixing portions for respectively corresponding to the engaging portions of the second engaging member 367, so as to fix the corresponding supporting surface cooperatively with the engaging portion of the second engaging member 367. Accordingly, the corresponding supporting surface is stably oriented downwards and abutted against the holding surface 40. As for which one is adopted, it depends on practical demands.

In this embodiment, the constraining portion 3710 of the sliding block 371 can be a recess structure with two constraining structures 3712 on its internal sides, as shown in FIG. 4 and FIG. 5. By engagement of the constraining structures 3712 and one of the fixing portions 3690, 3692, 3694 of the fixing member 369, the constraining portion 3710 of the sliding block 371 can fix the shaft 361 cooperatively with the first engaging member 363. It should be noticed that structures of the constraining portion 3710 of the sliding block 371 and the fixing portions 3690, 3692, 3694 of the fixing member 369 are not limited to those mentioned this embodiment.

For example, they can be structures of hooks and slots. In other words, structures allowing the constraining portion 3710 to fix the shaft 361 cooperatively with the fixing portions 3690, 3692, 3694 are within the scope of the present invention.

In addition, the fixing lug 373 is disposed on a side of the sliding block 371 and has a first constraining slot 3730 and a second constraining slot 3732. The latching member 375 is disposed on the base 34, and the latching member 375 is used for selectively latching the first constraining slot 3730 or the second constraining slot 3732.

The push button 377 includes a main body 3770 and at least one hook 3772. In this embodiment, there are two hooks 3772 shown in FIG. 4.

The main body 3770 is slidably disposed on the base 34 of the electronic device 30. The hooks 3772 are connected to the main body 3770 and engaging with the sliding block 371, such that the sliding block 371 is driven to slide when the main body 3770 of the push button 377 is pushed. In this embodiment, the main body 3770 of the push button 377 and the sliding block 371 are disposed on opposite sides of the base 34. In other words, the hooks 3772 protrude from the main body 3770 and pass through the base 34, so as to engage with the sliding block 371. Accordingly, when the main body 3770 of the push button 377 is pushed, the sliding block 371 can be driven by the hooks 3772.

Furthermore, when the sliding block 371 is driven by the push button 377 and slides to the position in FIG. 3, the latching member 375 can engage with the first constraining slot 3730, so as to fix the sliding block 371 in the first position, as shown in FIG. 3. On the other hand, when the sliding block 371 is driven by the push button 377 and slides to the position in FIG. 5, the latching member 375 can engage with the second constraining slot 3732, so as to fix the sliding block 371 in the second position, as shown in FIG. 5.

Figure 9:
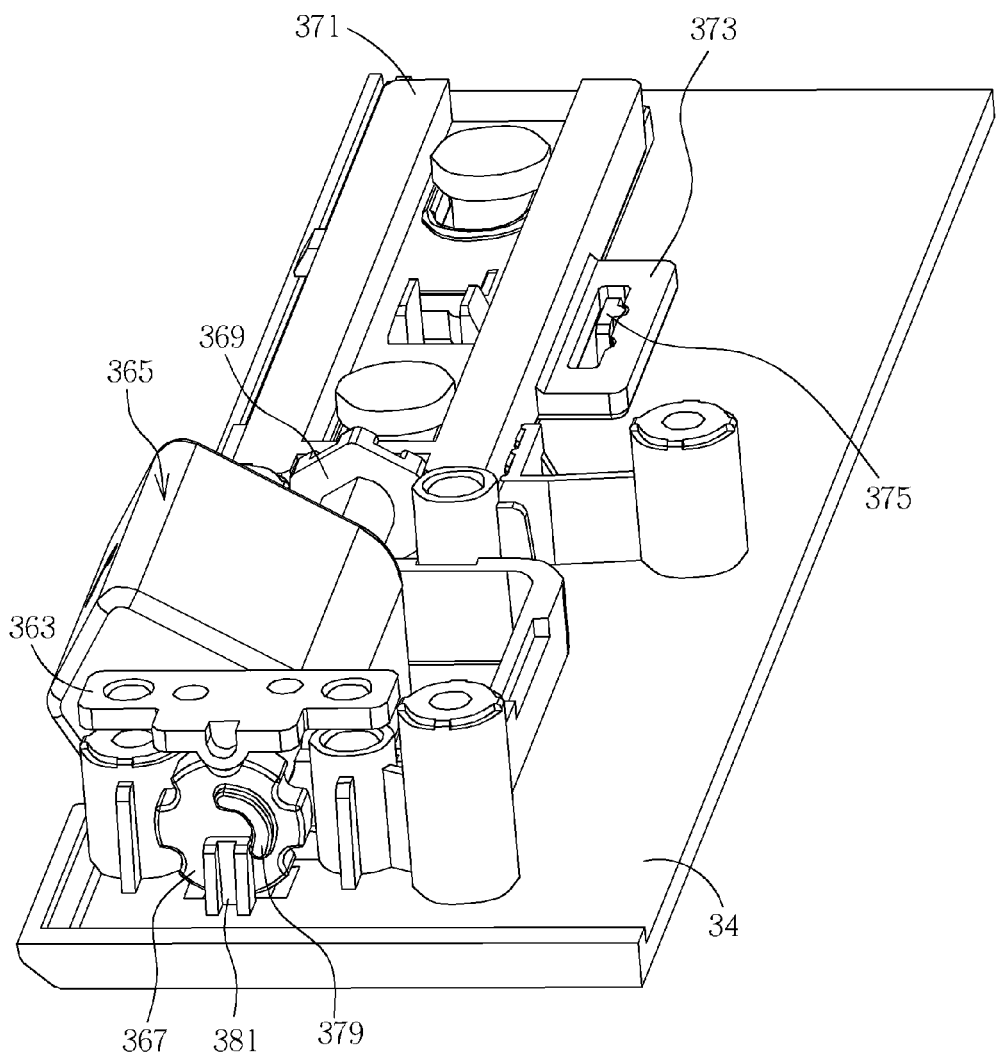
FIG. 9 is a diagram illustrating that a second engaging member is located in a first stopping position according to the embodiment of the present invention.
Figure 10:
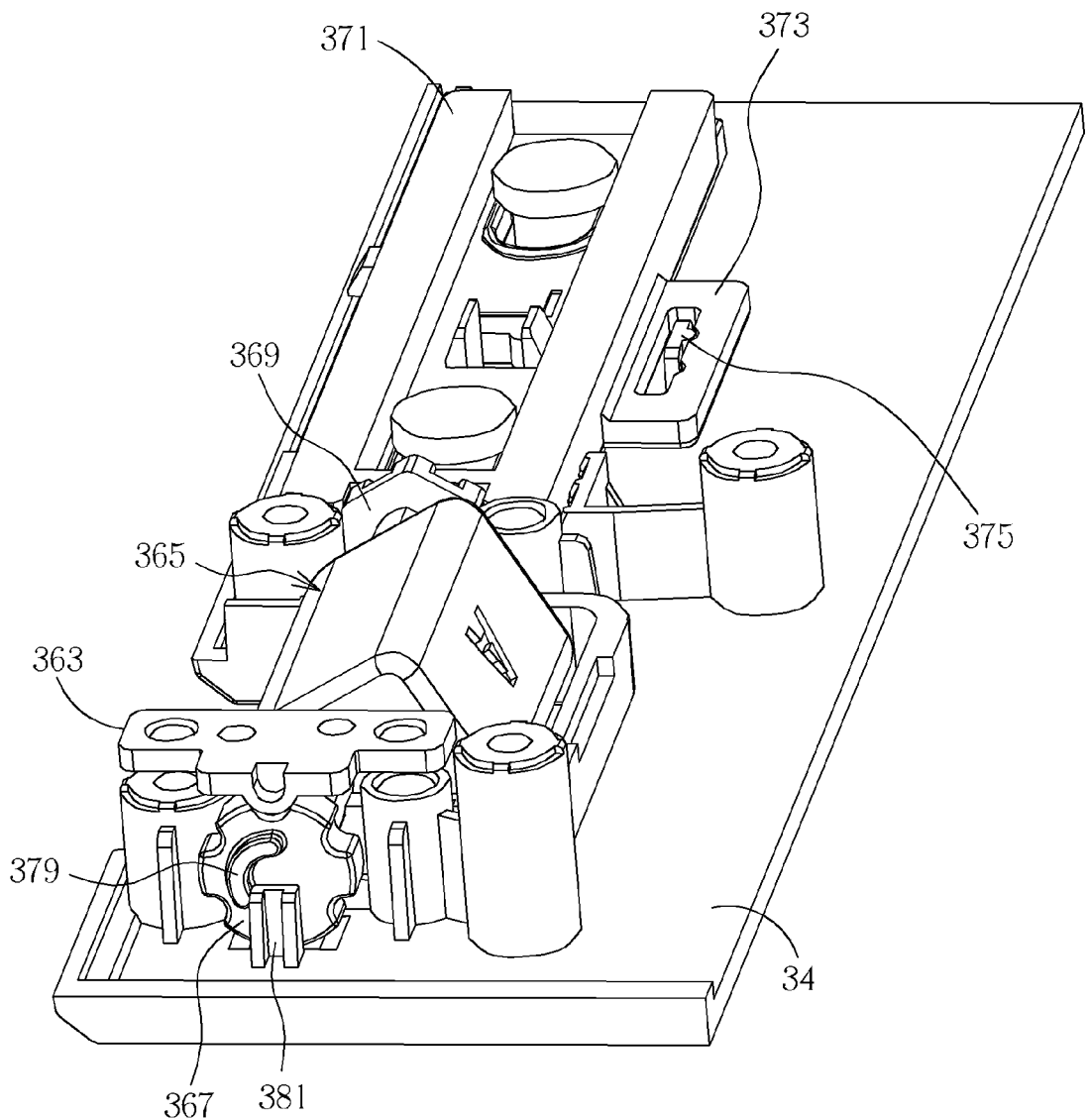
FIG. 10 is a diagram illustrating that the second engaging member is located in a second stopping position according to the embodiment of the present invention.

In addition, the footstand mechanism 36 further includes an angle constraining structure 379 and a stopper structure 381. Please refer to FIG. 9 and FIG. 10. FIG. 9 is a diagram illustrating that the second engaging member 367 is located in a first stopping position according to the embodiment of the present invention. FIG. 10 is a diagram illustrating that the second engaging member 367 is located in a second stopping position according to the embodiment of the present invention. As shown in FIG. 9 and FIG. 10, the angle constraining structure 379 can be substantially a C-shaped structure and formed on the second engaging member 367. The stopper structure 381 is disposed on the base 34 for respectively stopping one of both ends of the angle constraining structure 379. When the second engaging member 367 is rotated with the shaft 361 to the position in FIG. 9, the end of the angle constraining structure 379 abuts against the stopper structure 381, such that the second engaging member 367 is stopped in the first stopping position. On the other hand, when the second engaging member 367 is rotated with the shaft 361 to the position in FIG. 10, the other end of the angle constraining structure 379 abuts against the stopper structure 381, such that the second engaging member 367 is stopped in the second stopping position. In such a manner, the shaft 361 can only rotate within a region between the first stopping position and the second stopping position. In other words, the angle constraining structure 379 is capable of constraining a rotating stroke of the shaft 361 cooperatively with the stopper structure 381, so as to constrain a rotating angle of the polygonal block 365. It should be noticed that the angle constraining structure 379 and the stopper structure 381 can be omitted. In other words, the rotating angle of the polygonal block 365 can not be constrained as mentioned in this embodiment, it depends on practical demands.

Figure 11:
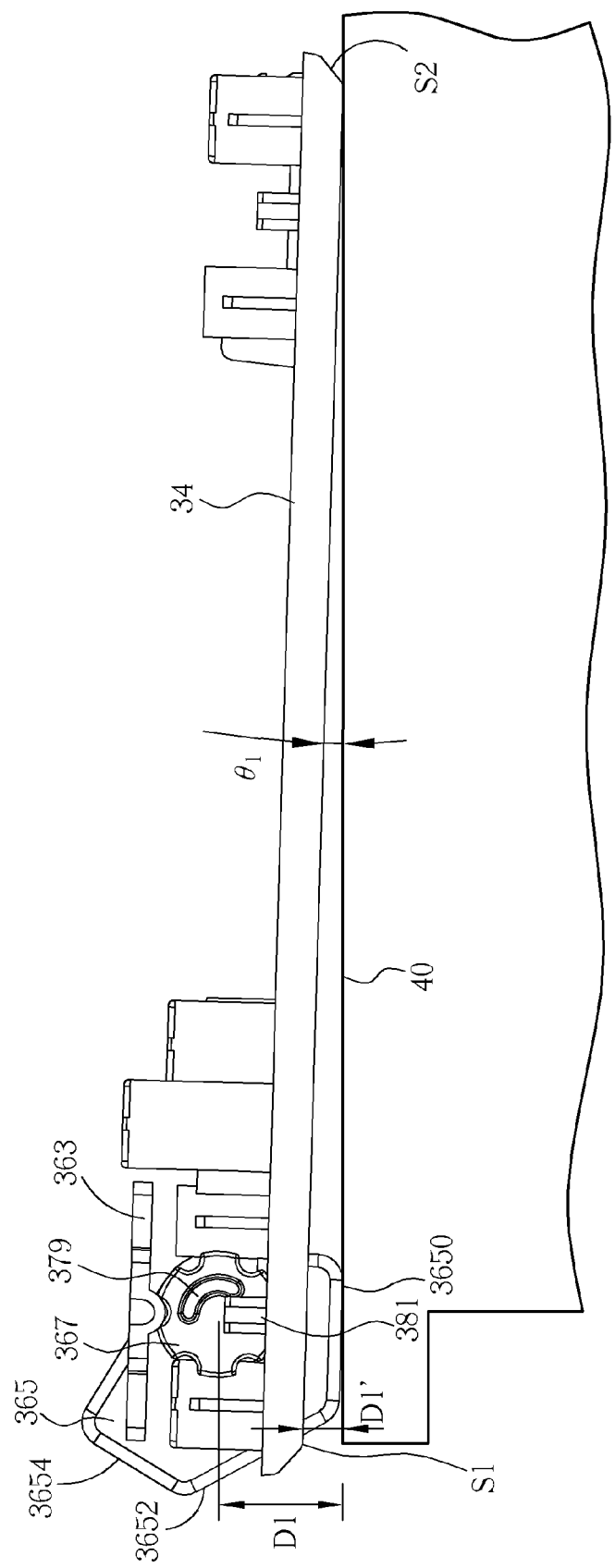
FIG. 11 is a diagram illustrating that a first tilt angle is included between the base and a holding surface according to the embodiment of the present invention.
Figure 12:
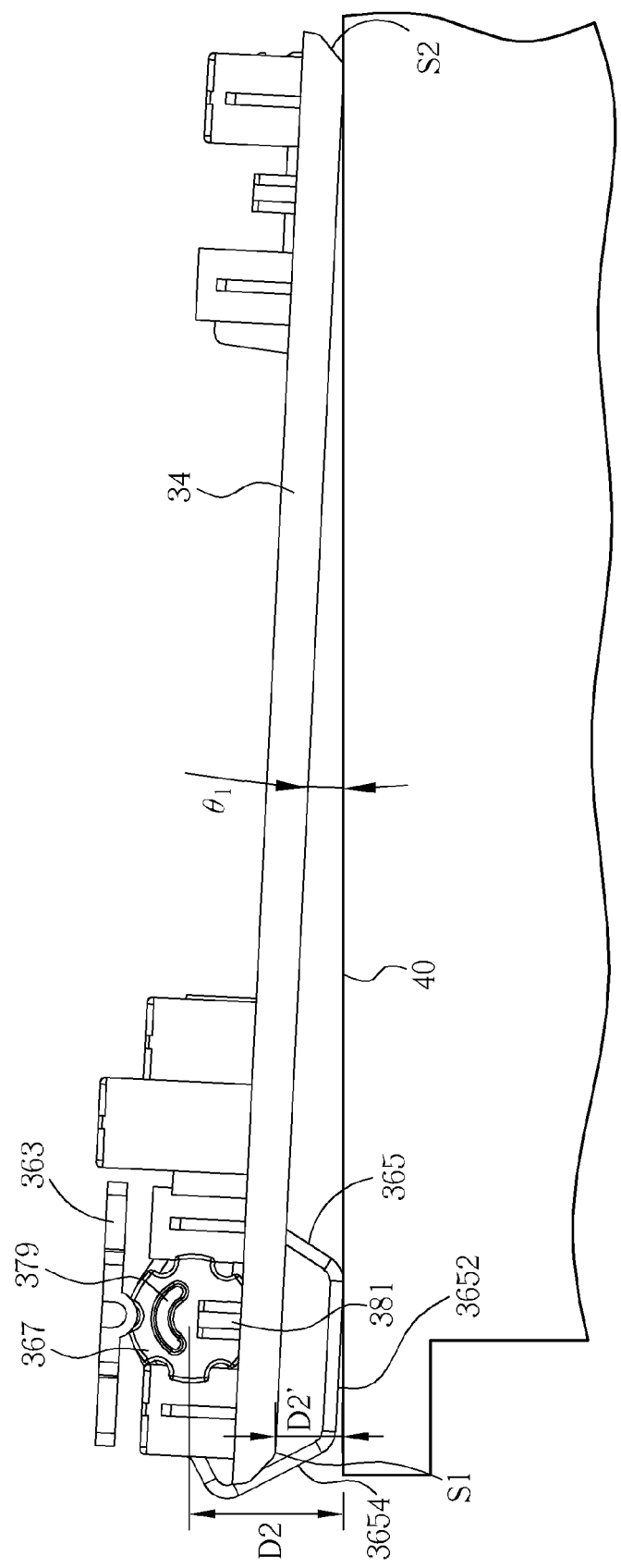
FIG. 12 is a diagram illustrating that a second tilt angle is included between the base and the holding surface according to the embodiment of the present invention.

More detailed description for principle of the footstand mechanism 36 is provided as follows. Please refer to FIG. 3, FIG. 5, FIG. 11 and FIG. 12. FIG. 11 is a diagram illustrating that a first tilt angle $\theta_1$ is included between the base 34 and the holding surface 40 according to the embodiment of the present invention. FIG. 12 is a diagram illustrating that a second tilt angle $\theta_2$ is included between the base 34 and the holding surface 40 according to the embodiment of the present invention. When the shaft 361 is rotated to the position wherein the supporting surface 3650 is oriented downwards, the engaging portion 3670 of the second engaging member 367 can engage with the first engaging member 363. Then, the main body 3770 of the push button 377 is pushed to drive the sliding block 371 to move to the first position in FIG. 3. In the meanwhile, the constraining portion 3710 of the sliding block 371 can fix the fixing portion 3690 of the fixing member 369. In such a manner, the constraining portion 3710 can fix the shaft 361 cooperatively with the engaging portion 3670. Accordingly, the supporting surface 3650 can be stably oriented downwards and face the holding surface 40. In the meanwhile, if the electronic device 30 is disposed on the holding surface 40, the supporting surface 3650 can abut the holding surface 40 stably.

Furthermore, since the supporting surface 3650 is away from the shaft 361 by the first distance D1 and the shaft 361 is disposed on the first side S1 of the base 34, the first side S1 of the base 34 can be lifted by a first distance D1', and the second side S2 opposite to the first side S1 of the base 34 abuts against the holding surface 40. In such a manner, there is the first tilt angle $\theta_1$ included between the electronic device 30 and the holding surface 40, as shown in FIG. 11.

If adjustment of the tilt angle between the electronic device 30 and the holding surface 40 is desired, the main body 3770 of the push button 377 is pushed to drive the sliding block 371 to move to the first position in FIG. 3 to the second position in FIG. 5. In the meanwhile, the constraining portion 3710 of the sliding block 371 can fix the fixing portion 3690 of the fixing member 369, so as to release rotation constraint of the shaft 361. Then, the main body 3770 of the push button 377 is pushed again to drive the sliding block 371 to move from the second position in FIG. 5 to the first position in FIG. 3. In the meanwhile, the constraining portion 3710 of the sliding block 371 engages with the fixing portion 3692 of the fixing member 369. In such a manner, the constraining portion 3710 can fix the shaft 361 cooperatively with the engaging portion 3670.

Accordingly, the supporting surface 3652 can be stably oriented downwards and face the holding surface 40. In the meanwhile, if the electronic device 30 is disposed on the holding surface 40, the supporting surface 3652 can abut the holding surface 40 stably.

Furthermore, since the supporting surface 3652 is away from the shaft 361 by the second distance D2 and the shaft 361 is disposed on the first side S1 of the base 34, the first side S1 of the base 34 can be lifted by a second distance D2', and the second side S2 opposite to the first side S1 of the base 34 abuts against the holding surface 40. In such a manner, there is the second tilt angle $\theta_2$ included between the electronic device 30 and the holding surface 40, as shown in FIG. 12.

Since abutting of the supporting surface 3654 and the holding surface 40 is similar to that mentioned above, it is omitted herein for simplicity.

Compared to the prior art, the footstand mechanism of the present invention utilizes the plurality of supporting surfaces of the polygonal block to abut against a holding surface when the polygonal block rotates with the shaft. In addition, since the supporting surfaces are respectively away from the shaft by different distances, the footstand mechanism of the present invention is capable of lifting the shaft above the holding surface with different distances by utilizing the polygonal block. For example, when a first supporting surface of the polygonal block abuts against the holding surface, the shaft can be lifted above the holding surface by a first distance. When the polygonal block is rotated with the shaft to a position where a second supporting surface abuts against the holding surface, the shaft can be lifted above the holding surface by a second distance. Accordingly, the polygonal block of the footstand mechanism lifts a bottom of the related electronic device with different distances. In such a manner, the footstand mechanism of the present invention is capable of adjusting the tilt angle of the related electronic device corresponding to different environments, so as to greatly enhance convenience and comfort of the electronic device in use as well as to satisfy demands for ergonomics.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A footstand mechanism for adjusting a tilt angle of an electronic device, comprising:
   a shaft rotatably disposed on a base of the electronic device;
   a first engaging member disposed on the base and located in a position corresponding to an end of the shaft;
   a polygonal block installed on the shaft and rotating with the shaft, the polygonal block comprising a plurality of supporting surfaces, the plurality of supporting surfaces being respectively away from the shaft by different distances;
   a second engaging member disposed at the end of the shaft and comprising a plurality of engaging portions, the plurality of engaging portions being corresponding to the plurality of supporting surfaces for respectively engaging with the first engaging member;
   a fixing member disposed at another end of the shaft and comprising a plurality of fixing portions respectively corresponding to the plurality of the engaging portions of the second engaging member; and
   a sliding block disposed on the base and located nearby the fixing member, the sliding block comprising a constraining portion for engaging with a corresponding fixing portion when the sliding block slides to a first position and when any one of the plurality of engaging portions engages with the first engaging member, so as to fix the shaft, the constraining portion separating from the fixing member when the sliding block slides to a second position, so as to release the shaft.

2. The footstand mechanism of claim 1, wherein the constraining portion is a recess structure.

3. The footstand mechanism of claim 1, further comprising:
   a fixing lug disposed on a side of the sliding block and having a first constraining slot and a second constraining slot; and a latching member for selectively latching the first constraining slot or the second constraining slot, so as to fix the sliding block at the first position or at the second position, correspondingly.

4. The footstand mechanism of claim 1, further comprising a push button, the push button comprising:
a main body slidably disposed on the base of the electronic device; and
at least one hook connected to the main body and engaging with the sliding block for driving the sliding block when the main body slides.

5. The footstand mechanism of claim 1, further comprising:
an angle constraining structure for constraining a rotating stroke of the shaft, so as to constrain a rotating angle of the polygonal block.

6. The footstand mechanism of claim 1, wherein the plurality of supporting surfaces comprises three supporting surfaces.

7. An electronic device, comprising:
a base; and
a footstand mechanism disposed on the base and comprising:
a shaft rotatably disposed on the base;
a first engaging member disposed on the base and located in a position corresponding to an end of the shaft;
a polygonal block installed on the shaft and rotating with the shaft, the polygonal block comprising a plurality of supporting surfaces, the plurality of supporting surfaces being respectively away from the shaft by different distances;
a second engaging member disposed at the end of the shaft and comprising a plurality of engaging portions, the plurality of engaging portions being corresponding to the plurality of supporting surfaces for respectively engaging with the first engaging member;
a fixing member disposed at another end of the shaft and comprising a plurality of fixing portions respectively corresponding to the plurality of the engaging portions of the second engaging member; and
a sliding block disposed on the base and located nearby the fixing member, the sliding block comprising a constraining portion for engaging with a corresponding fixing portion when the sliding block slides to a first position and when any one of the plurality of engaging portions engages with the first engaging member, so as to fix the shaft, the constraining portion separating from the fixing member when the sliding block slides to a second position, so as to release the shaft.

8. The electronic device of claim 7, wherein the constraining portion is a recess structure.

9. The electronic device of claim 7, wherein the footstand mechanism further comprises:
a fixing lug disposed on a side of the sliding block and having a first constraining slot and a second constraining slot; and
a latching member for selectively latching the first constraining slot or the second constraining slot, so as to fix the sliding block at the first position or at the second position, correspondingly.

10. The electronic device of claim 7, wherein the footstand mechanism further comprises:
a main body slidably disposed on the base; and
at least one hook connected to the main body and engaging with the sliding block for driving the sliding block when the main body slides.

11. The electronic device of claim 7, wherein the footstand mechanism further comprises:
an angle constraining structure for constraining a rotating stroke of the shaft, so as to constrain a rotating angle of the polygonal block.

12. The electronic device of claim 7, further comprising a protective cover disposed on the base for covering the footstand mechanism.

13. The electronic device of claim 7, wherein the plurality of supporting surfaces comprises three supporting surfaces.

14. The electronic device of claim 7, being a notebook computer or a docking station.

* * * * *